Dec. 10, 1963 G. F. TROTTER 3,113,599
DISPENSING NOZZLE WITH RESILIENT TANK CAP HOLDER
Filed Nov. 3, 1960
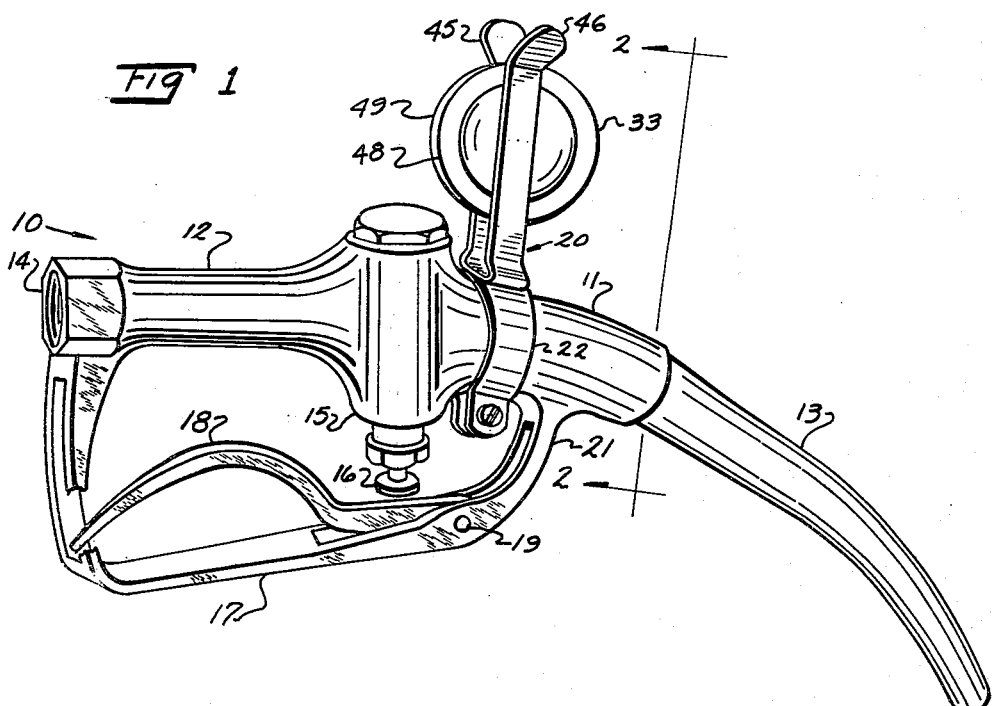
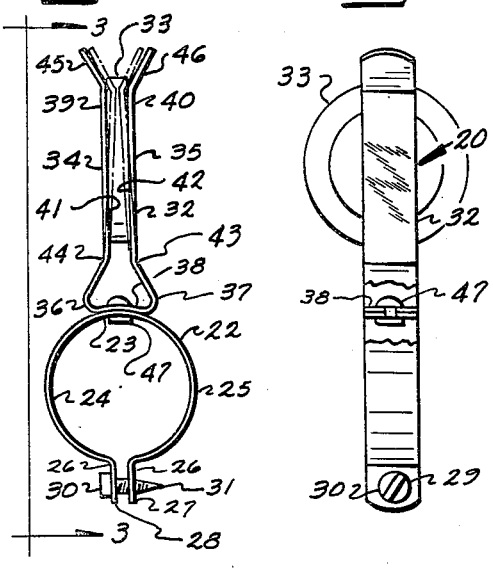
INVENTOR.
GERALD F. TROTTER
BY
Gerald R. Hershberger
ATTORNEY

United States Patent Office 3,113,599
Patented Dec. 10, 1963

3,113,599
DISPENSING NOZZLE WITH RESILIENT TANK CAP HOLDER
Gerald F. Trotter, 43263 Eleven Mile Road, Novi, Mich., assignor of one-third to Leo Harrawood, Novi, and one-third to Anthony Renne, Drayton Plains, Mich.
Filed Nov. 3, 1960, Ser. No. 67,014
4 Claims. (Cl. 141—392)

This invention relates to fuel dispensing nozzles commonly associated with filling station fuel pumps, with devices cooperating with said nozzles for holding a motor vehicle fuel tank cap, and with structure of a mechanical fuel tank cap holder.

It often happens that motor vehicle fuel tank caps are misplaced or lost due to the failure of the filling station attendant to replace such cap after filling the gasoline tank of the vehicle. This situation is of considerable annoyance to the operator of the vehicle, resulting in loss of customers to the owner of the station, and is a safety hazard as well due to the possibility that gasoline from the open tank will become accidentally ignited. I believe that certain serious disadvantages reside in present combined dispensing nozzle gasoline tank cap holding arrangements due to structure relatively expensive to manufacture. Further, the cap securing means of former arrangements will not accommodate fuel tank caps which are constructed of or coated with various non-magnetic materials; will not position the fuel cap where it is readily visible by the attendant; and will not positively secure the fuel tank cap against slipping from the holder when the nozzle is jarred or bumped, since magnetic attraction or flux is relatively weak in shearing stress.

A primary object of my invention therefore, is to provide an inexpensive dispensing nozzle tank cap holding device constructed to include resilient means which will accommodate fuel tank caps of substantially uniform thickness constructed of any material including non-ferrous metals, plastic materials, ferrous metal, or ferrous metals coated with non-magnetic materials and which will grip both top and bottom sides of such caps to insure against dislodging them by bumping or jarring of the nozzle and the resultant loss of time to the attendant in retrieving such cap.

A further object of the invention is to provide a unique fastening arrangement between the nozzle and the tank cap holder to permit the holder to be fixedly assembled to the nozzle body in a convenient location without interfering with the nozzle lever guard or the attendant's hand when dispensing fuel from the nozzle, and which may be readily shaped to fit various size nozzles.

Another object of this invention is to provide a holding device positively clamped to a part of the nozzle as a permanent, durable, non-sagging, weather-resistant part of the nozzle and wherein the cap holding portion is located outwardly from the nozzle in clear view so that the attendant can't miss seeing the cap and will remember to replace it after filling the fuel tank.

A further object of this invention is to provide a tank cap holding device wherein the clamping means and resilient holding means are fixedly held together as a self-contained unit.

The foregoing and other objects and important advantages of the present invention will become more readily apparent from the ensuing description in connection with the accompanying drawings, and wherein:

FIGURE 1 is a side elevation perspective of a dispensing nozzle with the resilient tank cap holding means applied thereto, and with a fuel tank cap held securely in said resilient means.

FIGURE 2 is an orthographic projection end view of the structure of FIGURE 1 taken in direction of arrows 2—2.

FIGURE 3 is an orthographically projected side view of the resilient holder taken in direction of arrows 3—3.

In the drawings, the invention discloses a nozzle generally denoted as 10, of a type which includes an annular nozzle body 11 having a spout 13 on one end thereof for dispensing fuel into the vehicle tank, a hose attachment portion 14 on its opposite end, a handle portion 12 adjacent the hose attachment portion, and a valve chamber 15 located forwardly of said handle portion of said body from which extends a valve plunger 16 A valve lever guard 17 is fastened fixedly to said nozzle body adjacent said spout end, looped outwardly of the nozzle body and fixedly attached at its opposite end adjacent the hose attachment portion of the nozzle body.

Valve operating lever 18 is pivoted at one of its ends on the lever guard 17 adjacent the spout end 13 by pin 19 and has its free end extended parallel to the nozzle body 11 inside said guard rearwardly towards said hose attachment end to permit the attendant to grasp said nozzle body handle portion 12 and said lever 18 simultaneously with his hand. As lever 18 is pivoted about pin 19, the plunger 16 is depressed by said lever to start the flow of fuel.

Referring to the drawing, it is evident that the resilient tank cap holder of this invention, generally denoted as numeral 20, is adapted to be fixedly clamped around the annular nozzle body 11 between the forward attaching end 21 of the lever guard 17 and the valve chamber portion 15. The resilient gasoline tank cap holder 20 comprises a strap 22 which is reversely bent intermediate its ends at 23, so as to provide an outer bowed strap leg 24 and an inner bowed strap leg 25 spaced from the outer strap leg. The lower end of each strap leg is straightened at 26 so as to provide an inner flange 27 and an outer flange 28 spaced adjacent each other to define a narrow opening when the bowed legs of the strap 22 engage the sides of said annular nozzle body. A sheet metal screw 29 extends through inner flange 27 and outer flanfie 28 with its head portion 30 engaging said outer flange and its thread portion 31 threaded into a smaller opening in said inner flange for clamping said strap 22 rigidly to said annular nozzle body. The strap 22 is preferably made of a suitable non-corrosive metal such as stainless steel or brass, thin enough in cross section to be easily bent so that it can be modified by hand or with the use of hand tools only to fit various sizes of nozzles without expensive machine tooling being required to form said strap.

The resilient element portion 32 of said holder 20, preferably of one-piece construction, is provided to receive and grip the tank cap 33. Said resilient element 32 includes a pair of relatively long resilient spring strip fingers or jaws 34 and 35 fixedly fastened at corresponding ends 36 and 37 to a relatively short base member 38 with the free ends 39 and 40 thereof extending outwardly from said nozzle as cantilevers with the finger walls 41 and 42 thereof substantially parallel to each other and reversely bent inwardly at 43 and 44 to define a narrow opening. The tips of said fingers 39 and 40 are bent outwardly at 45 and 46 to an angle of approximately 30 degrees from said finger walls 41 and 42 to provide a lead angle for readily inserting the fuel tank cap 33 between said walls. The resilent element 32, when represented by the solid lines of FIGURE 2, denotes said fingers in fuel cap holding position, and when said fingers are denoted by dotted lines, said fuel cap is removed.

The resilient element 32 is fixedly joined to said strap 22 at intermediate point 23 by rivet 47 extending through said strap and said base member 38 intermediate the junction of the fixed ends 36 and 37 of said fingers.

Said resilient element 32 is preferably constructed of suitable metal such as steel or brass, with the thickness of the metal selected to provide a suitable gripping effect without interfering with the passage of the tank cap into the opening between said finger walls. As the tank cap is pressed into said finger opening, the fingers 34 and 35 spread exerting pressure against both the top 48 and the bottom 49 of said tank cap thereby holding said cap securely in position outwardly of said nozzle.

In the finger arrangement disclosed the fingers 34 and 35 are fastened at their fixed ends to base member 38. Although such base member is disclosed, it is understood that said fingers may be fixedly fastened directly to said strap without such base member by welding or other suitable means.

While I have illustrated and described the preferred form of construction, I do not wish to limit myself to the precise details of structure shown, but desire to avail myself of such variations and modifications as may come within the scope of the appended claims.

Having thus described my invention, what I claim as new and desire to secure by Letters Patent is:

1. In combination with a gasoline station fuel dispensing nozzle including an annular nozzle body having a spout on one end thereof and a hose attachment portion on the opposite end thereof, with the portion of the nozzle body adjacent said hose attachment portion arranged to provide a handle for the operator, a fluid dispensing valve chamber contained in said nozzle, and a lever guard connected to said nozzle body adjacent said hose portion looped outwardly from said nozzle body around said handle portion and connected to said nozzle body adjacent said spout end; a device for detachably retaining an automotive fuel tank closure cap to said nozzle independently of magnetic flux, said cap having walls defining an annular generally flat top face and an opposed bottom edge, walls defining a flanged rim of substantial depth connected to the periphery of said top face interconnecting said top face and bottom face; said device including a movable spring actuated jaw member fixedly connected to said nozzle to extend outwardly normal to said nozzle body and extending a substantial distance therefrom in a direction opposite to that at which the nozzle guard extends for movement with said nozzle, secondary jaw backing means mounted on said nozzle juxtapositioned with said movable jaw member to define an opening suitable to effect springing of said jaw member so as to exert substantial resilient pressure to firmly grip the opposed top face and bottom edge of the fuel tank cap across the flanged rim thereof in response to the insertion of said top face and bottom edge between said jaw member and said jaw backing element, so that said cap is detachably suspended in any position which said nozzle body may assume firmly against dislodging thereof by inadvertent striking of said nozzle against a foreign object by the user thereof, and held firmly in a position outward and upward and edgewise to said nozzle body in full view of the operator when said dispensing nozzle is placed in the filler neck of an automobile.

2. In combination with a gasoline station fuel dispensing nozzle including an annular nozzle body having a spout on one end thereof and a hose attachment portion on the opposite end thereof, with the portion of the nozzle body adjacent said hose attachment portion arranged to provide a handle for the operator, a fluid dispensing valve chamber contained in said nozzle, and a lever guard connected to said nozzle body adjacent said hose portion looped outwardly from said nozzle body around said handle portion and connected to said nozzle body adjacent said spout end; a device for detachably retaining an automotive fuel tank closure cap to said nozzle independently of magnetic flux, said cap having walls defining an annular generally flat top face and an opposed bottom edge, walls defining a flanged rim of substantial depth connected to the periphery of said top face interconnecting said top face and bottom face; said device including a movable spring actuated jaw member fixedly mounted on said annular nozzle body to extend outwardly normal thereto and extending a substantial distance therefrom in a direction opposite to that at which the nozzle guard extends, secondary jaw backing means mounted on said nozzle juxtapositioned with said movable jaw member to define an opening suitable to effect springing of said jaw member so as to exert substantial resilient pressure to firmly grip the opposed top face and bottom edge of the fuel tank cap across the flanged rim thereof in response to the insertion of said top face and bottom edge between said jaw member and said jaw backing element, so that said cap is detachably suspended in any position which said nozzle body may assume firmly against dislodging thereof by inadvertent striking of said nozzle against a foreign object by the user thereof, and held firmly in a position outward and upward and edgewise to said nozzle body in full view of the operator when said dispensing nozzle is placed in the filler neck of an automobile; and a take-up element fixedly fastening said jaw member to said annular nozzle body for movement with said nozzle.

3. In combination with a gasoline station fuel dispensing nozzle including an annular nozzle body having a spout on one end thereof and a hose attachment portion on the opposite end thereof, with the portion of the nozzle body adjacent said hose attachment portion arranged to provide a handle for the operator, a fluid dispensing valve chamber contained in said nozzle, and a lever guard connected to said nozzle body adjacent said hose portion looped outwardly from said nozzle body around said handle portion and connected to said nozzle body adjacent said spout end; a device for detachably retaining an automotive fuel tank closure cap to said nozzle independently of magnetic flux, said cap having walls defining an annular generally flat top face and an opposed bottom edge, walls defining a flanged rim of substantial depth connected to the periphery of said top face interconnecting said top face and bottom face; said device including a flexible strap member bent adjacent its end so as to provide inner and outer legs defining a pocket therebetween to receive said annular body of the fuel pump nozzle; a take-up element connected to said strap adjacent the extremity thereof to fixedly draw said strap legs tightly against opposed faces of said nozzle body; and a resilient one-piece clamping element including a base portion relatively shorter than the diameter of the flexible strap member, but substantially greater in length than the thickness of an automotive fuel tank closure cap and having sufficient wall area to facilitate fixedly securing said base portion to the wall of said flexible strap and a pair of substantially long resilient juxtapositioned spring strip finger portions forming a continuation of said base portion, said fingers reversely bent towards each other from the ends of said base portion in generally triangular outline to a spaced opening adjacent said base portion, said opening generally approximating in depth the thickness of an automotive fuel tank closure cap, said fingers extending outwardly from said opening and generally normal to said base portion in a direction normal to said nozzle body and opposite to that at which the lever guard extends with the tips of said fingers converging towards each other in unsprung position, said fingers being of sufficient length to extend substantially across said flat face of said fuel tank cap to facilitate effective gripping action, said fingers adapted to spring open upon insertion of an automotive fuel tank closure cap between them to assume a conditioned position where they generally parallel each other to firmly grip said fuel tank cap on opposite sides thereof, to hold said cap in a position outward and upward and edgewise to said nozzle body in full view of the operator when said dispensing nozzle is placed in the filler neck of an automobile.

4. In combination with a gasoline station dispensing nozzle including an annular nozzle body having a spout on one end thereof and a hose attachment portion on the opposite end thereof, with the portion of the nozzle body adjacent said hose attachment portion arranged to provide a handle for the operator, a fluid dispensing valve element associated with said nozzle body, a lever guard connected to said nozzle body adjacent said hose portion and looped outwardly from said handle portion and connected to said nozzle body adjacent said spout end, and a lever cooperating with said guard to operate said valve element; a device for detachably retaining to said nozzle an automotive fuel tank closure cap constructed of a generally hard, solid material of substantial weight, said cap having a wall defining an annular generally flat top face, an opposed bottom edge, and walls defining a flanged rim of substantial depth connected to the periphery of said top face and interconnecting said top face and opposed bottom edge; said device comprising opposed substantially flat gripping walls fixedly fastened to said nozzle body to extend outwardly normal to said nozzle body and extending a substantial distance therefrom in a direction opposite to that at which the lever guard extends, said walls being pre-conditioned to squeeze the opposed top face and bottom edge of said cap across the flanged rim thereof in response to insertion of said top face and bottom edge between said opposed gripping walls independently of magnetic flux so that said cap is detachably suspended in a position outward and upward and edgewise to said nozzle body in full view of the operator when said dispensing nozzle is placed in the filler neck of an automobile.

References Cited in the file of this patent

UNITED STATES PATENTS

| | | |
|---|---|---|
| 884,256 | Addie | Apr. 7, 1908 |
| 1,745,548 | Lerner | Feb. 4, 1930 |
| 1,774,775 | Weitz | Sept. 2, 1930 |
| 2,191,782 | Valane | Feb. 22, 1940 |
| 2,569,068 | Maxwell | Sept. 25, 1951 |
| 2,800,931 | Sutcliffe | July 30, 1957 |
| 2,826,206 | Slater | Mar. 11, 1958 |
| 2,830,741 | Cusick | Apr. 15, 1958 |
| 2,930,156 | Jones | Mar. 29, 1960 |
| 2,988,318 | Ferreri | May 2, 1961 |